June 6, 1967 D. BURNON 3,323,148
STRETCHING CLAMP FOR UPHOLSTERY WEBBING
Filed Dec. 11, 1964
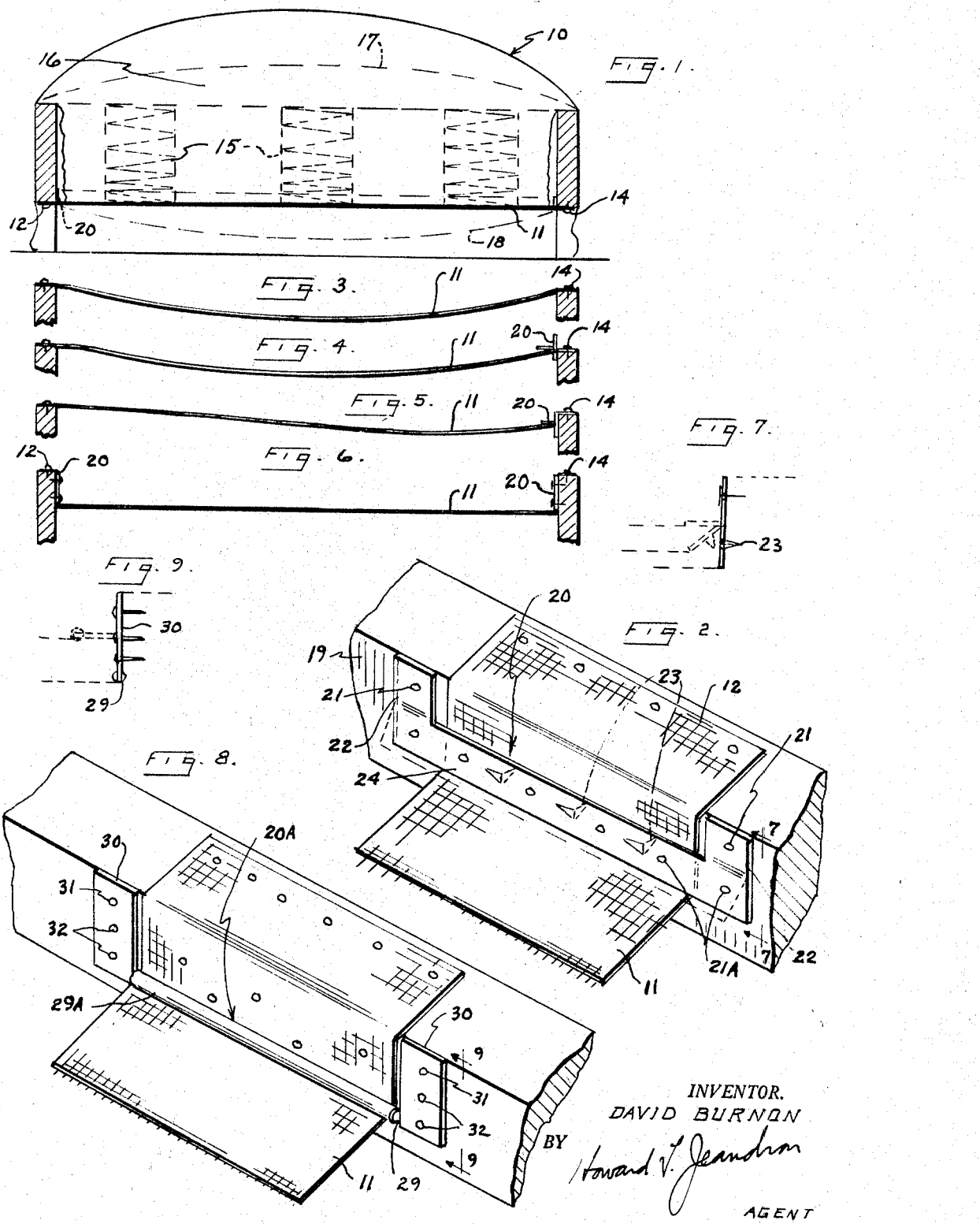
INVENTOR.
DAVID BURNON
BY Howard V. Jeandron
AGENT

# United States Patent Office 3,323,148
Patented June 6, 1967

3,323,148
STRETCHING CLAMP FOR UPHOLSTERY
WEBBING
David Burnon, 118 Edgware Place,
Neptune, N.J. 07753
Filed Dec. 11, 1964, Ser. No. 417,550
3 Claims. (Cl. 5—211)

This invention relates to the method of fastening upholstery webbing on the bottom of chairs, divans, sofas and similar articles of furniture, and more particularly to the means of fastening said webbing in a taut relationship with said furniture.

The webbing referred to is the standard webbing used to support the springs and stuffing of cushion chairs. It has been customary to tack the webbing to the under framework of the chair by means of a plurality of carpet or upholstery tacks. The webbing used is a coarse weave and with constant use has a tendency to stretch. This is especially true when the webbing becomes old and dry. It may be restretched or refastened in a tight, taut relationship or it may be replaced. When restretching the webbing, it must be properly stretched and fastened to provide a good support. The average person, lacking the skill and special tools cannot restretch or replace the webbing and provide an acceptable supporting repair.

The prior art illustrates means for affixing the webbing to the bottom surface of the framework of the furniture such as Patent No. 2,146,592. This illustrates a more positive gripping means for the end of the webbing where affixed to the furniture. Likewise Patent No. 1,867,607 illustrates a webbing support that is also affixed to the bottom surface of the framework of the furniture. This device provides a flange on the webbing support to slightly depress the webbing when it is affixed thus assisting in slightly stretching the webbing. However the devices found in the prior art are all affixed to the bottom surface of the framework so that the stress or pull of the webbing is at right angles to the fastening tacks and in time tends to tear the end of the webbing and break loose.

It is an object of this invention to provide means for restretching the webbing and fastening the webbing to both the inner underface and the bottom face of the framework of the furniture so that the webbing cannot tear loose.

A further object of this invention is to provide means for restretching the webbing and fastening in a good taut relationship to provide a good support.

A further object of this invention is to provide means of taking the slack out of supporting webbing that is in good condition and is still capable of providing a good support for springs and cushions of upholstered furniture.

A still further object of this invention is to provide a bracket that is easily affixed across the webbing to the bottom surfaces of an article of furniture to increase the stretch of the webbing and restore said webbing to its original form.

A still further object of this invention is to provide a bracket that is easily affixed across the webbing to be affixed to the inner bottom surface of a framework of furniture and in which there is included means to adjust the position of affixing said bracket to provide the degree of restretching said webbing.

Further objects of this invention shall be apparent by reference to the accompanying detailed description and the drawings in which FIG. 1 illustrates a cross sectional view of a piece of furniture, FIG. 2 is a perspective illustration of a bracket mounted over webbing according to this invention, FIG. 3 is a schematic illustration of furniture with webbing having too much slack or stretch, FIG. 4 is a schematic view of the first step in the installation of a bracket to stretch the webbing, FIG. 5 is a second step in the installation of said bracket, FIG. 6 is a third step in the installation of a pair of brackets, FIG. 7 is a side elevational view taken on line 7—7 of FIG. 2, FIG. 8 is a perspective illustration of a further embodiment of said bracket, and FIG. 9 is an illustration of a further embodiment taken on line 9—9 of FIG. 8.

Referring to the drawings there is illustrated in FIG. 1 a piece of furniture such as an ottoman 10. The ottoman 10 is shown in cross section to illustrate the normal mounting of a plurality of strips of webbing 11 mounted across the bottom of the ottoman being fastened to the ottoman at 12 and 14. The webbing thus provides the supporting flexible framework for springs 15, the springs 15 in turn supporting the cushion 16. With extended use of the ottoman 10, the cushion 16 continually exerts pressure on springs 15 and springs 15 exert pressure on the resilient framework of webbing 11 tending to stretch the webbing between the supported ends 12 and 14 until the cushion has been reduced such as indicated by the dotted line 17 to produce a sag of the webbing such as indicated by the dotted line 18. In this condition the ottoman 10 would normally require reupholstering or resetting to restore it to its original form. In the event the webbing 11 is still well fastened at points 12 and 14, a pair of brackets 20 as illustrated in FIG. 2 may be utilized to restretch the webbing 11. A bracket 20 may be positioned at each end of each strap or strip of webbing 11. By tacking the bracket through the perforations 21 to the bottom inside surface 19 of the ottoman at the same areas 12 and 14 to which the webbing has been attached, the bracket will be in position for stretching. The bracket 20 is provided with two legs 22 and a cross bar or portion 24 that bears upon the webbing. Portion 24 is normally in an angular relationship to the legs 22 (as shown in dotted lines, FIG. 7). The portion 24 may be 10° or more from the legs 22 thus portion 24 will be depressed into the webbing 11 when the bracket 20 is pushed tightly against the bottom surface 19 (FIG. 2) and the portion 24 may be fastened by tacks or screws through the apertures 21A to thus hold the bracket in the relationship as shown and also the portion 24 may be provided with punched prongs 23 facing surface 19 to hold the webbing 11 stretched as illustrated. It is to be noted that the face of portion 24 in contact with surface 19 may take various forms. The face may be provided as a plurality of gripping prongs 23 or the face may be simply ground to a rough face to insure a tendency to grip the webbing. To illustrate the method of restretching the webbing 11 in the event it is still securely fastened at the points 12 or 14, referring to FIGS. 3 through 6, the old webbing may be badly stretched (FIG. 3). To provide a good tight strap in web 11 a bracket 20 may be installed on one side (FIG. 4) and fastened adjacent to 14 thus stretching the webbing 11 as illustrated in FIG. 5 and in the event the webbing requires further stretching a second bracket 20 may be attached adjacent the point 12 further stretching the webbing 11 as illustrated in FIG. 6 to provide a tight relationship of the webbing to the furniture supporting the springs and cushion that is carried thereon.

The bracket 20 may take other forms as illustrated in the further embodiment, FIG. 8, in which a bracket 20A is illustrated. The bracket is slightly different in form having a circular tube or bar 29 with flat ends 30. The ends 30 extend at 90° from said portion 29. The bracket ends 30 are bendable as shown in FIG. 9 to provide easy mounting. The rounded edge of portion 29 may provide an easier depression upon the webbing 11. To provide a stretching of the webbing as illustrated, and to insure a good tight mounting of webbing 11, the ends 30 of bracket 20A are affixed by a screw or tack at 31 and the bracket 20A is pivotally depressed from the dotted position FIG. 9 to the mounted position shown (FIG. 8) and the screws or tacks affixed at 32 to retain the webbing properly stretched. For old webbing requiring greater stretching, the bracket 20 may be moved downward slightly and the tack may be affixed at 31 and the bracket pivotally moved to the desired horizontal position shown in FIG. 8 and the remaining screws or tacks inserted.

A further embodiment is in appearance similar to FIG. 8, however in this embodiment the circular portion 29 is in fact a roller 29A mounted over portion 29. To assist in retaining the restretched webbing 11, additional tacks are applied through the webbing to surface 19. It is to be understood that the clamps 20 and 20A are necessarily constructed of a width to fit standard webbing so that the webbing will fit between the legs 22 or 30 to permit the clamp 20 to be properly installed. It is also to be understood that the clamps 20 and 20A are constructed of a stiff strong material, metal or plastic, to retain their shape when installed to thus provide the necessary degree of stretching of the webbing 11 and to retain the stretched condition when the webbing 11 is being further stretched in use. It is to be further understood that a single clamp or a plurality of clamps may be utilized to repair any webbing requiring additional stretching and although the clamps 20 or 20A have been designed to be tacked into position as illustrated in FIGS. 2 and 7, it is to be understood that screws may be utilized to insure retaining the clamps in the relationship as illustrated. When the prongs 23 are attached directly to the clamp, the clamp may be hammered into position. Various other changes may be made such as for special webbing of a smaller or greater size, the width may be changed without departing from this invention and this invention shall be limited only by the appended claims.

I claim:
1. The combination with upholstery webbing and a furniture framework, of means for restretching said webbing after it has sagged to renew its function and form, said means including a bracket adapted to be placed over said webbing at the end of said webbing upon the bottom face of said furniture framework where the webbing is attached and in line with the inner face of said framework, said clamp including two legs attachable to the bottom inner face of said furniture when the webbing is slightly depressed and said clamp provided with a flat body portion connecting said two legs, said legs formed at right angles to said body portion for attaching to the inner face of said furniture surface, said body portion providing a depressing surface that bears against said webbing to totally depress and restretch it, said pair of legs provided with apertures in a spaced relationship for fastening said pair of legs, said body portion provided with apertures for fastening said body portion after said webbing has been totally depressed and restretched.

2. In a device according to claim 1 in which said body portion is provided with a rough gripping surface.

3. In a device according to claim 1 in which said body portion is initially positioned in an angular relationship to said pair of legs and is bent and depressed into an alignment with said legs and fastened to said inner face of said furniture framework.

References Cited

UNITED STATES PATENTS

| 1,790,861 | 2/1931 | Harvey | 160—378 X |
| 1,806,405 | 5/1931 | Mailloux | 5—263 X |
| 1,836,463 | 12/1931 | Galla | 160—404 |
| 1,867,607 | 7/1932 | Warren | 160—404 |
| 1,894,262 | 1/1933 | Bank | 5—263 X |
| 1,895,309 | 1/1933 | Boomershine | 160—378 |

CASMIR A. NUNBERG, *Primary Examiner.*

R. D. KRAUS, *Assistant Examiner.*